J. COPPERSMITH.
JOINT.
APPLICATION FILED MAY 3, 1909. RENEWED FEB. 14, 1910.

952,608.

Patented Mar. 22, 1910.

Witnesses
Margaret Beigle.
Edna Wendorf

Inventor
Jacob Coppersmith
by N. C. Love
Attorney

UNITED STATES PATENT OFFICE.

JACOB COPPERSMITH, OF COLLINWOOD, OHIO, ASSIGNOR OF ONE-HALF TO C. W. COPPERSMITH, OF COLLINWOOD, OHIO.

JOINT.

952,608.  Specification of Letters Patent.  Patented Mar. 22, 1910.

Application filed May 3, 1909, Serial No. 493,560. Renewed February 14, 1910. Serial No. 543,901.

*To all whom it may concern:*

Be it known that I, JACOB COPPERSMITH, a citizen of the United States, residing at Collinwood, in the county of Cuyahoga, in the State of Ohio, have invented certain new and useful Improvements in Joints, of which the following is a specification.

This invention relates to joints, and consists in certain improvements in the construction thereof as will be hereinafter fully described and pointed out in the claims.

The invention is particularly adapted for pipe joints, and in the accompanying drawings is so illustrated.

Figure 1:
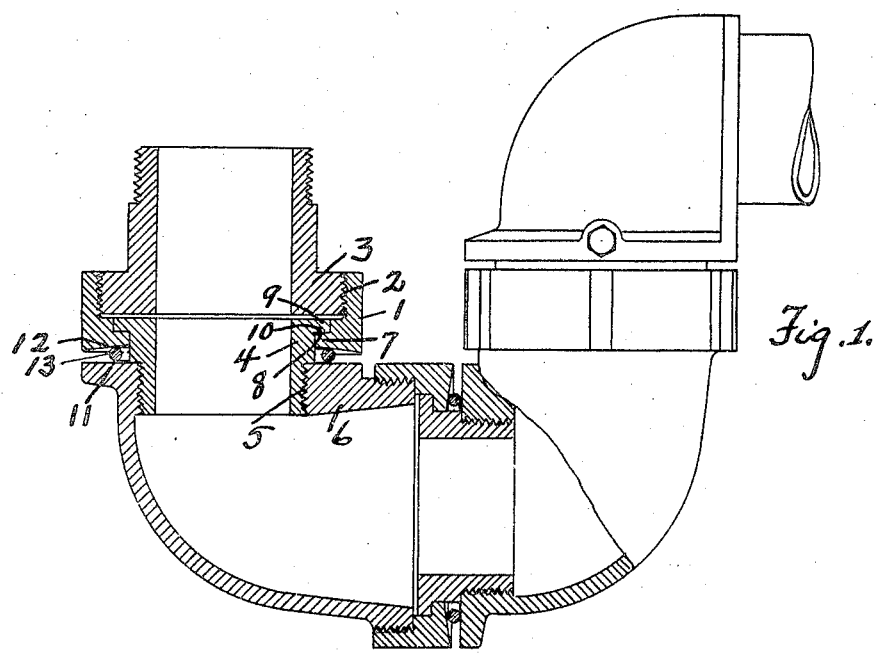
Figure 2:
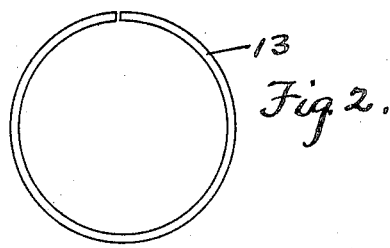

Figure 1 shows a side elevation partly in section of a joint formed according to my invention. Fig. 2 a plan view of the expanding ring used in the joint.

1 marks the female member. This has the screw threads 2, into which the pipe 3 is screwed.

4 marks the male member. This has the screw threads 5 onto which the pipe fitting 8 is screwed. The female member has the shoulder 7 on which is arranged the annular joint surface 8, and opposed to this is the annular joint surface 10 on the shoulder 9 of the male member 4. The fitting 6 forms a shoulder 11 on the male member. This is opposed to the shoulder 12 on the female member. The surfaces of these shoulders I term the take up surfaces to distinguish them from the joint surfaces. One of these surfaces, as shown on the surface of the shoulder 12, is tapered preferably forming the larger space toward the axis.

A split spring ring is arranged in the space between the take up surfaces, the ring is normally larger than these surfaces, and is compressed as it is put in place, so that it tends to expand, and thus crowds itself toward the narrow part of the space between the take up surfaces. In this way the joint is kept constantly tight, the pressure being such as will be exerted by the spring acting on the wedge forming the tapered surfaces. On the other hand the spring being interposed between these surfaces prevents the opening of the joint, so that the joint is closed by spring pressure, but it cannot be opened by pressure. Furthermore the spring cannot be subjected to strain by manipulating the joint, so that it will last indefinitely. The spring is particularly desirable in joints that are used for steam or gases of high temperature, because being arranged outside of the joint it remains sufficiently cool to retain its temper.

What I claim as new is:

1. A joint comprising a male member and a female member, said members having opposing annular joint surfaces, and opposing annular take up surfaces tapered relatively to each other; and a split spring ring interposed between the take up surfaces and tensioned to force itself toward the narrower part of the space between the take up surfaces.

2. A joint comprising a male member and a female member, said members having opposing annular joint surfaces, and opposing annular take up surfaces tapered relatively to each other with the wider part of the space between the take up surfaces toward the axis of the joint; and a split spring ring interposed between the take up surfaces, said ring being normally compressed and tending to force itself outwardly toward the narrower part of the space between the take up surfaces.

3. A joint comprising a tubular male member, and a female member surrounding the male member, said members having opposing annular joint surfaces, and opposing annular take up surfaces tapered relatively to each other; and a split spring ring interposed between the take up surfaces and tensioned to force itself toward the narrower part of the space between the take up surfaces.

4. A joint comprising a male member having a shoulder 9 with joint surfaces 10 thereon, and screw threads 5; a female member having the shoulders 7 with the joint surfaces 8 opposing the joint surfaces 9, said female member being screw threaded at 2; a fitting 6 screwed onto the male member and forming a shoulder 11, the surfaces between the shoulder 11 and the female member being tapered relatively to each other; and a spring arranged between these surfaces and tensioned to force itself toward the narrower part of the space between the surfaces.

In testimony whereof I have hereunto set my hand in the presence of two subscribing witnesses.

JACOB COPPERSMITH.

Witnesses:
J. R. CRAIG,
H. C. LORD.